US009823834B2

(12) United States Patent
Zeng (10) Patent No.: US 9,823,834 B2
(45) Date of Patent: Nov. 21, 2017

(54) QUICK ACCESS GESTURE SETTING AND ACCESSING METHOD FOR A TOUCH CONTROL DEVICE

(71) Applicant: GUANG DONG OPPO MOBILE TELECOMMUNICATIONS CORP., LTD., Guangdong (CN)

(72) Inventor: Yuanqing Zeng, Guangdong (CN)

(73) Assignee: GUANG DONG OPPO MOBILE TELECOMMUNICATIONS., LTD., Guangdong (CN)

( * ) Notice: Subject to any disclaimer, the term of this patent is extended or adjusted under 35 U.S.C. 154(b) by 1040 days.

(21) Appl. No.: 14/038,754

(22) Filed: Sep. 27, 2013

(65) Prior Publication Data

US 2014/0033140 A1   Jan. 30, 2014

Related U.S. Application Data

(63) Continuation-in-part of application No. PCT/CN2012/082452, filed on Sep. 29, 2012.

(30) Foreign Application Priority Data

Jul. 11, 2012 (CN) .......................... 2012 1 0237943

(51) Int. Cl.
*G06F 3/0488* (2013.01)
*G06F 3/0484* (2013.01)

(52) U.S. Cl.
CPC ........ *G06F 3/0488* (2013.01); *G06F 3/04847* (2013.01); *G06F 3/04883* (2013.01)

(58) Field of Classification Search
CPC ....................................... G06F 3/0481–3/0489
See application file for complete search history.

(56) References Cited

U.S. PATENT DOCUMENTS

| 5,396,264 A * | 3/1995 | Falcone ................ G06F 3/0482 340/7.55 |
| 5,673,405 A * | 9/1997 | Tange .................. G06F 3/04817 715/745 |
| 6,452,617 B1 * | 9/2002 | Bates ...................... G06F 3/038 715/744 |
| 7,477,233 B2 * | 1/2009 | Duncan ............... G06F 3/04883 178/18.01 |

(Continued)

*Primary Examiner* — Steven B Theriault
(74) *Attorney, Agent, or Firm* — Kirton McConkie; Evan R. Witt (57) ABSTRACT

A quick access function setting method for a touch control device is provided, comprising: establishing one-to-one correspondence relation between input gestures of a touch screen and a designated quick access module; saving parameters of the input gestures in the memory area of a central processing unit; regularly detecting input signals in a touch control area and recording the input signals into a memory of the central processing unit by the touch screen in the working state; comparing the input signals with the parameters in the memory area, and executing the corresponding quick access function template if the input signals are matched with the parameters. By the method, it is able to conveniently and quickly access the required function module, and even access the function module with the keyboard locked, thus saving time for searching the function templates on the touch interface.

12 Claims, 9 Drawing Sheets

(56) References Cited

U.S. PATENT DOCUMENTS

| | | | | |
|---|---|---|---|---|
| 8,136,053 B1* | 3/2012 | Miller | G06F 3/04883 | 345/156 |
| 8,250,471 B2* | 8/2012 | Wang | G06F 1/1626 | 715/702 |
| 8,434,023 B2* | 4/2013 | Ge | H04M 1/72586 | 715/745 |
| 8,564,555 B2* | 10/2013 | Day | G06F 3/0416 | 178/18.01 |
| 8,581,877 B2* | 11/2013 | Yoo | G06F 3/0488 | 345/173 |
| 8,620,296 B2* | 12/2013 | Gravino | H04M 1/274516 | 379/142.04 |
| 8,630,623 B2* | 1/2014 | Park | G06F 3/0488 | 345/173 |
| 8,723,825 B2* | 5/2014 | Wright | G06F 3/0416 | 345/156 |
| 8,811,948 B2* | 8/2014 | Bandyopadhyay | G06F 1/1643 | 345/173 |
| 8,830,270 B2* | 9/2014 | Zaman | G06F 3/04883 | 345/473 |
| 8,854,318 B2* | 10/2014 | Borovsky | G06F 3/04883 | 345/156 |
| 8,922,575 B2* | 12/2014 | Garside | G06T 15/005 | 345/557 |
| 9,141,284 B2* | 9/2015 | Sands | G06F 3/042 | |
| 2002/0180622 A1* | 12/2002 | Lui | G06F 9/445 | 341/22 |
| 2003/0080993 A1* | 5/2003 | Baker | G06F 17/30899 | 715/738 |
| 2005/0210417 A1* | 9/2005 | Marvit | G06F 1/1613 | 715/863 |
| 2006/0084478 A1* | 4/2006 | Erlichmen | H04M 1/274583 | 455/566 |
| 2006/0132447 A1* | 6/2006 | Conrad | G06F 3/0219 | 345/168 |
| 2006/0161889 A1* | 7/2006 | Stabb | G06F 9/45512 | 717/113 |
| 2006/0227100 A1* | 10/2006 | Kun | G06F 3/0236 | 345/156 |
| 2007/0013672 A1* | 1/2007 | Shim | G06F 3/04886 | 345/173 |
| 2007/0083827 A1* | 4/2007 | Scott | G06F 9/4443 | 715/811 |
| 2007/0130547 A1* | 6/2007 | Boillot | G06F 3/017 | 715/863 |
| 2007/0192731 A1* | 8/2007 | Townsend | G06F 3/0488 | 715/788 |
| 2008/0012832 A1* | 1/2008 | GuangHai | G06F 3/03547 | 345/173 |
| 2008/0106523 A1* | 5/2008 | Conrad | G06F 3/0486 | 345/173 |
| 2008/0125173 A1* | 5/2008 | Chen | G06F 3/0482 | 455/557 |
| 2008/0136587 A1* | 6/2008 | Orr | G08C 19/00 | 340/5.31 |
| 2008/0278455 A1* | 11/2008 | Atkins | G06F 3/04883 | 345/173 |
| 2009/0125850 A1* | 5/2009 | Karstens | G06F 3/0481 | 715/866 |
| 2009/0158213 A1* | 6/2009 | Ryu | H04M 1/7258 | 715/825 |
| 2009/0183124 A1* | 7/2009 | Sridhar | G06F 3/048 | 715/847 |
| 2009/0313544 A1* | 12/2009 | Wood | G06F 3/048 | 715/716 |
| 2009/0315867 A1* | 12/2009 | Sakamoto | G06F 3/03547 | 345/184 |
| 2010/0001967 A1* | 1/2010 | Yoo | G06F 3/0488 | 345/173 |
| 2010/0050128 A1* | 2/2010 | Chiang | G06F 9/4443 | 715/847 |
| 2010/0125815 A1* | 5/2010 | Wang | G06F 3/017 | 715/856 |
| 2010/0153876 A1* | 6/2010 | Kim | G06F 3/04886 | 715/800 |
| 2010/0162182 A1* | 6/2010 | Oh | G06F 3/04883 | 715/863 |
| 2010/0306718 A1* | 12/2010 | Shim | G06F 3/04883 | 715/863 |
| 2011/0028138 A1* | 2/2011 | Davies-Moore | G06F 3/04817 | 455/418 |
| 2011/0294467 A1* | 12/2011 | Kim | G06F 1/1643 | 455/411 |
| 2012/0009896 A1* | 1/2012 | Bandyopadhyay | G06F 1/1643 | 455/411 |
| 2012/0060123 A1* | 3/2012 | Smith | G06F 3/04883 | 715/833 |
| 2012/0098772 A1* | 4/2012 | Eun | G06F 3/04883 | 345/173 |
| 2012/0129496 A1* | 5/2012 | Park | G06F 3/0488 | 455/411 |
| 2012/0212420 A1* | 8/2012 | Shin | G06F 3/04883 | 345/173 |
| 2012/0229419 A1* | 9/2012 | Schwartz | G06F 3/0418 | 345/174 |
| 2012/0235938 A1* | 9/2012 | Laubach | G06F 3/0416 | 345/173 |
| 2012/0284673 A1* | 11/2012 | Lamb | G06F 3/04883 | 715/863 |
| 2013/0080964 A1* | 3/2013 | Shigeta | G06F 3/0488 | 715/773 |
| 2013/0227450 A1* | 8/2013 | Na | G06F 3/048 | 715/764 |
| 2013/0283199 A1* | 10/2013 | Selig | G06F 3/0484 | 715/781 |

* cited by examiner

(Related art)

QUICK ACCESS GESTURE SETTING AND ACCESSING METHOD FOR A TOUCH CONTROL DEVICE

BACKGROUND OF THE INVENTION

The present invention relates to a quick access gesture setting and accessing method for electronic products, in particular to a quick access gesture setting and accessing method for a touch control device.

Figure 1:
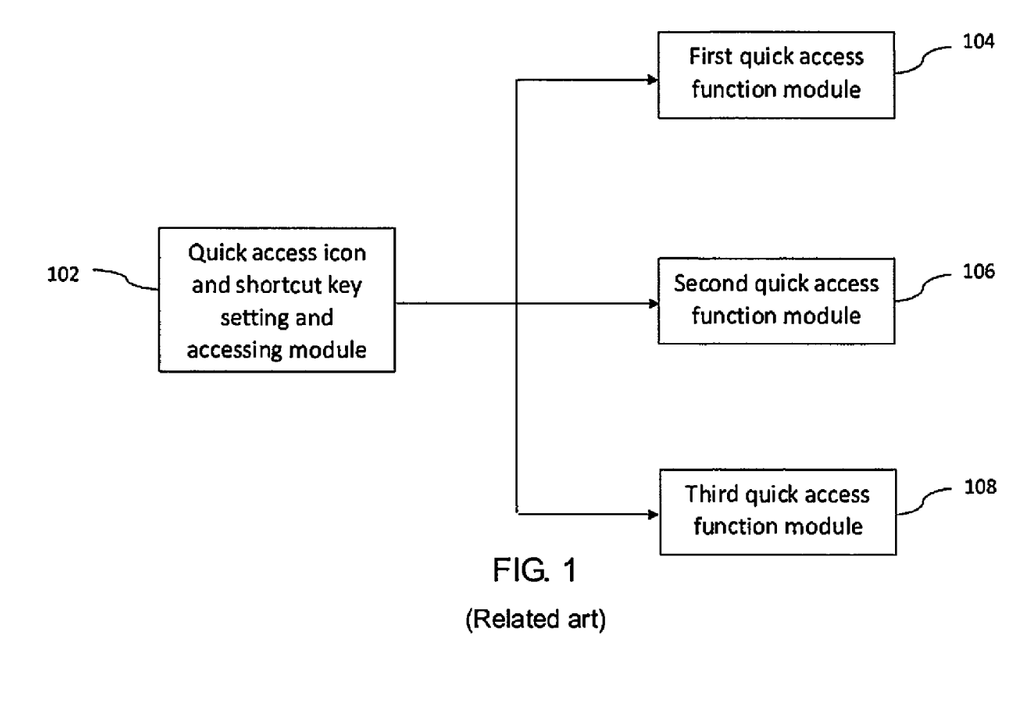
FIG. 1 is a schematic block diagram of a system for executing quick access functions using quick access icons and shortcut keys according to the related art.
Figure 2:
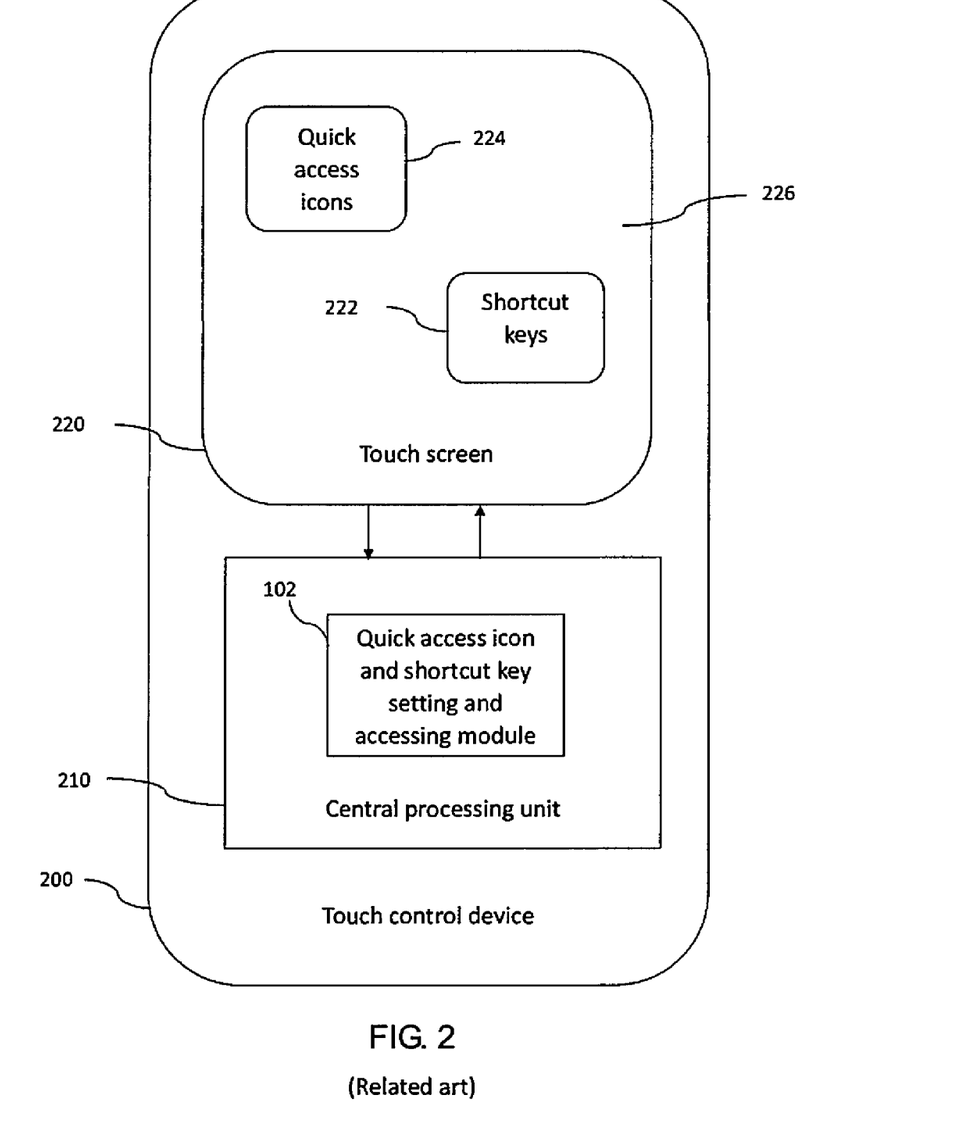
FIG. 2 is a schematic block diagram of a touch control device according to the related art.
Figure 3:
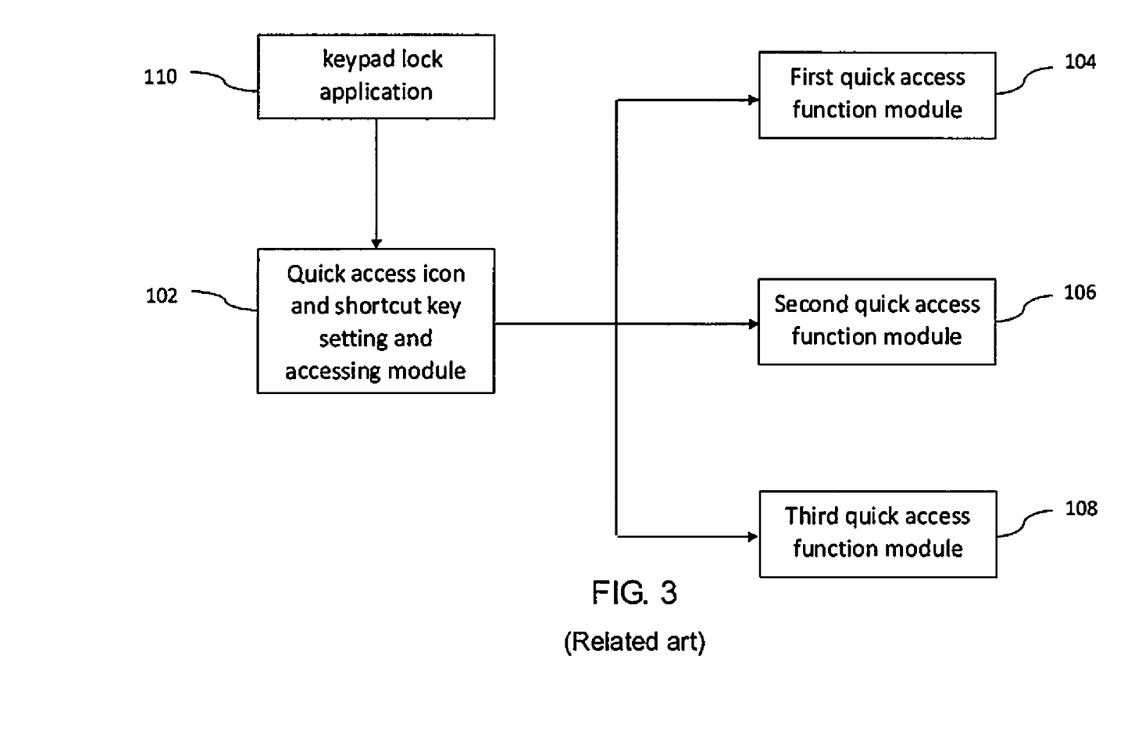
FIG. 3 is a schematic block diagram of a system for executing quick access functions using quick access icons and shortcut keys not accessible when a keypad lock application is loaded according to the related art.

At present, touch control devices (such as touch screen cell phones, tablet computer, MP4) are getting more and more popular and have become the mainstream products on the nowadays electronic market, gradually replacing the market position of the electronic devices with the traditional keypads. At the beginning when the mobile electronic products with touch screens appear on the market, the option selection modes and function option paths all are internally set in the system, so users fail to adjust the level of the function menus according to their personal use habits and feel inconvenient in use. Later, a quick access icon and shortcut key setting and accessing method is developed. The method is performed by a quick access icon and shortcut key setting and accessing module 102 in FIG. 1 loaded in a central processing unit 210 of a touch control device 200 in FIG. 2. In the method, as illustrated in FIG. 2, the users can set frequently-used functions according to the individual use habits through setting shortcut keys 222 or quick access icons 224 on the touch control device 200. Further, in the method, as illustrated in FIG. 2, the interface displays frequently-used function options corresponding to the frequently-used functions after the users press the shortcut keys 222, and then the users can select the required functions; or the touch screen 220 displays the quick access icons 224 corresponding to the frequently-used functions, and the users access the required functions through clicking the quick access icons 224. As illustrated in FIG. 1, the frequently-used functions are performed correspondingly by, for example, a first quick access function module 104, a second quick access function module 106 and a third quick access function module 108. However, the users usually are limited to quickly access the required functions in the above-mentioned ways due to number of the shortcut keys, size of the screen, size of the icons, etc. Furthermore, as illustrated in FIG. 3, when the touch control device 200 in FIG. 2 is loaded with a keypad lock application 110, the quick access icon and shortcut key setting and accessing method can only be performed after the touch control device 200 is unlocked. Therefore, users are required to enter the main interface 226 in FIG. 2 after unlocking, search the quick access icons 224 in FIG. 2 through slipping gestures and finally select functions through clicking the quick access icons 224 when intending to run a certain program, so much time is consumed and user experience is poor.

BRIEF SUMMARY OF THE INVENTION

To overcome above mentioned defects in the prior art, the present invention provides a quick access setting method for a touch control device such that users can conveniently and quickly enter their required function modules when using the touch control devices, thus solving the problem that the existing touch control devices need to research the related function modules first to access the related function modules.

The present invention is realized by the following technical scheme:

A quick access gesture setting and accessing method for a touch control device is provided. The touch control device comprises a central processing unit and a touch screen. The method comprises the following steps of:

establishing a one-to-one correspondence relation between input gestures of the touch screen and quick access function modules oriented to the input gestures, wherein the input gestures include single-finger slip, two-finger or multi-finger departure, two-finger or multi-figure closure, double or multiple consecutive clicks;

saving parameters of the input gestures in a memory area of the central processing unit;

regularly detecting the input signals in the touch control area and recording in the register of the central processing unit by the touch screen in the working state; and, comparing the recorded input signal with the parameters in the memory area, and executing the corresponding quick access function modules if the recorded input signals are matched with the parameters, otherwise prompting users to re-enter by the central processing unit.

The central processing unit of the touch control device is loaded with a keypad lock application, slips over the currently enabled keypad lock application and directly executes the corresponding quick access function modules when comparison shows that the information recorded in the register is matched with the parameters in the memory area in step 4.

Or, the system prompts users to exit the keypad lock application first if detecting that the keypad lock application is enabled when comparison shows that the information recorded in the register is matched with the parameters in the memory area in step 4.

Furthermore, the parameters of the single-finger slip input gesture include two-dimensional coordinate variable thresholds of the slipping trajectory; the parameters of the two-finger or multi-finger departure, two-finger input gesture include variable thresholds of distances between two fingers or among more fingers; and the parameters of double or multiple consecutive click input gesture include click times, click time interval thresholds and click pressure thresholds.

Parameters of the input gestures also include coordinate thresholds of the touch control area. The touch control area is the full screen or a blank area or any one area limited by the coordinate thresholds. The blank area refers to a blank area without other functional icons or other linking functions on the touch screen. The input gestures in this area do not cause operations except execution of the quick access function modules.

The quick access function modules include a short message service module, a phonebook module, a call log module, a network service module, a software/hardware setting module, a notepad module, an entertainment module and a dialing module.

The quick access function modules may also include a call log module oriented to a preset number, a network service module oriented to a preset website, a software/hardware setting module oriented to preset software/hardware, an entertainment oriented to the preset audio or video or game software and a dialing module oriented to a preset number.

The touch screen regularly detects the input signals in the touch control area at a scanning frequency of 20-100 Hz.

The touch control devices include touch screen cell phones, MP3, MP4, tablet computers, and palm computers.

The present invention detects trajectories and special actions of fingers in the touch control area, enters the corresponding programs and executes corresponding function modules when the detected trajectories are matched with those preset in the devices, so users can conveniently and quickly access their required function modules and even access the function modules with the keypad locked in the process of using the touch control devices, thus saving time for searching the corresponding function modules on the control interface.

DETAILED DESCRIPTION OF THE INVENTION

To be better understood by those skilled in the art better, the present invention is described in further detail with reference to the attached drawings.

Same reference numerals among different figures indicate substantially the same elements for one of which description is applicable to the others. Like reference numerals being among related figures and differentiable only with respect to an apostrophe indicate corresponding elements for one of which description is related to and compared to the others.

Figure 4:
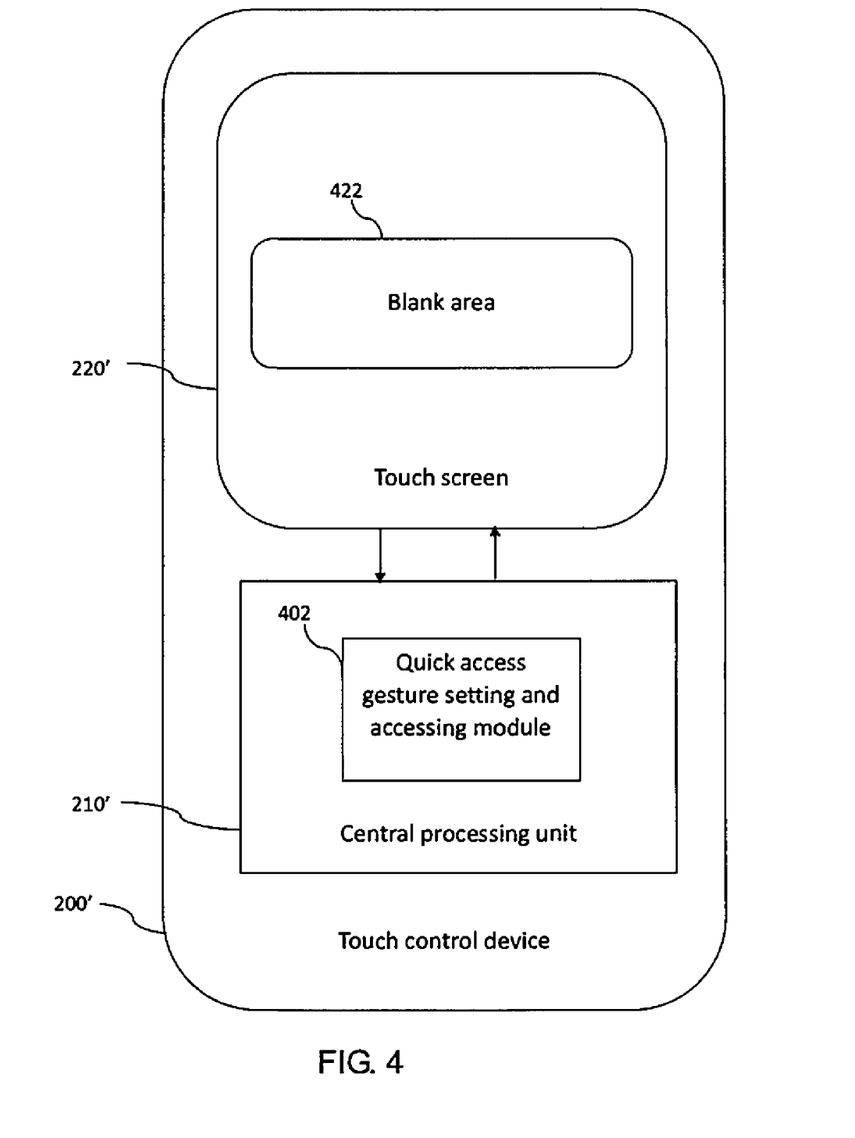
FIG. 4 is a schematic block diagram of a touch control device according to an embodiment of the present invention.
Figure 5:
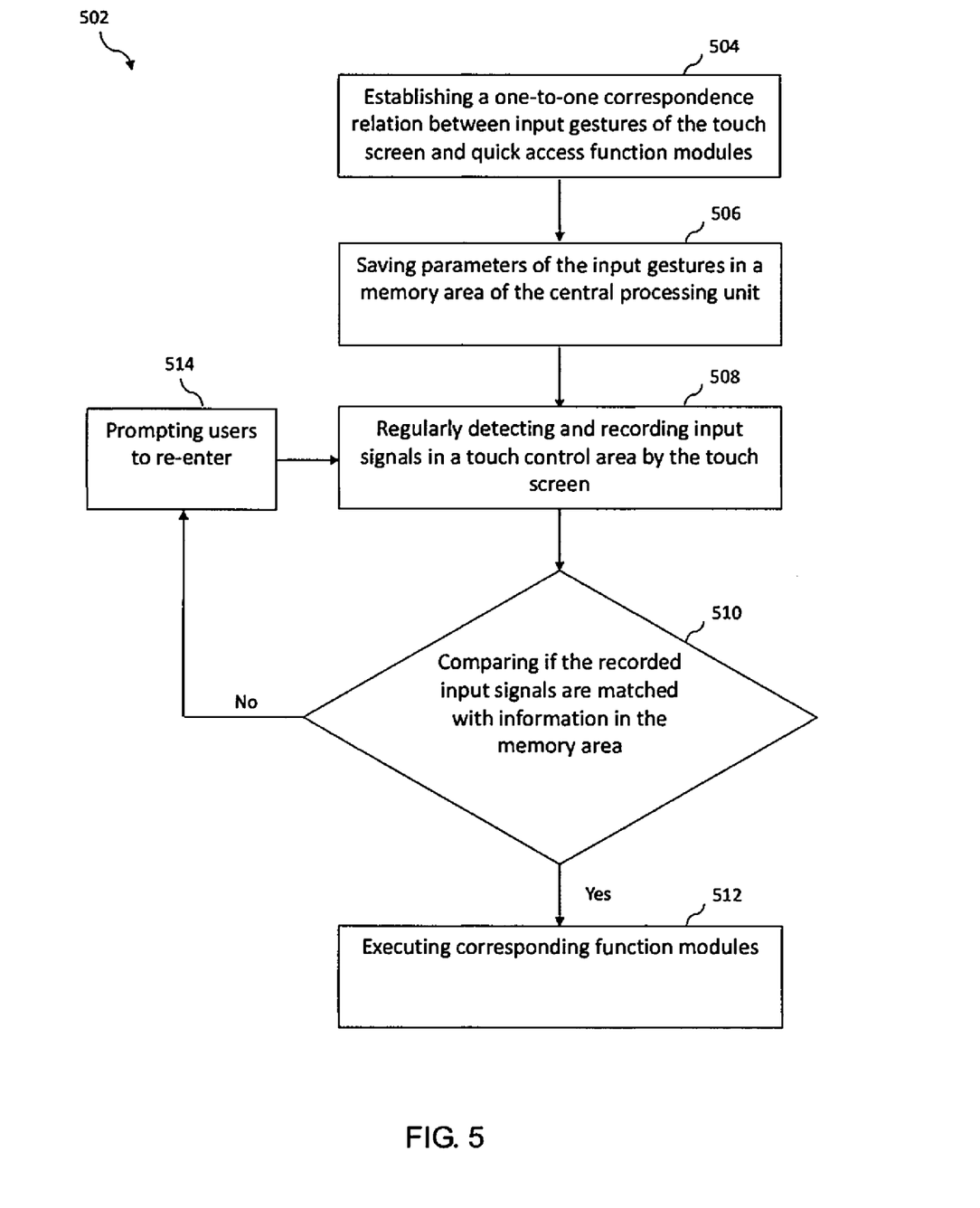
FIG. 5 is a flowchart of a quick access gesture setting and accessing method according to an embodiment of the present invention.

A quick access gesture setting and accessing method 502 in FIG. 5 for a touch control device 200' in FIG. 4 is provided. As illustrated in FIG. 4, the touch control device 200' comprises a central processing unit 210' and a touch screen 220' corresponding to the central processing unit 210 and the touch screen 220 in FIG. 2. The quick access gesture setting and accessing method 502 is performed by a quick access gesture setting and accessing module 402 loaded in the central processing unit 210'. As shown in FIG. 5, the method comprises the following steps of:

504, establishing a one-to-one correspondence relation between input gestures of the touch screen 220' and quick access function modules oriented to the input gestures, wherein input gestures includes, single-finger slip, two or more-finger departure, two or more-finger closure, double or multiple consecutive click;

506, saving parameters of the input gestures in a memory area of the central processing unit 210';

508, regularly detecting the input signals in the touch control area at a scanning frequency of 20-100 Hz and recording the input signals in a register of the central processing unit 210' by the touch screen 220' in the working state; and,

510, comparing the recorded input signals with the parameters in the memory area by the central processing unit 210', and 512, executing the corresponding quick access function module if the recorded input signals are matched with the parameters in the memory area; otherwise 514, prompting users to re-enter.

Figure 6:
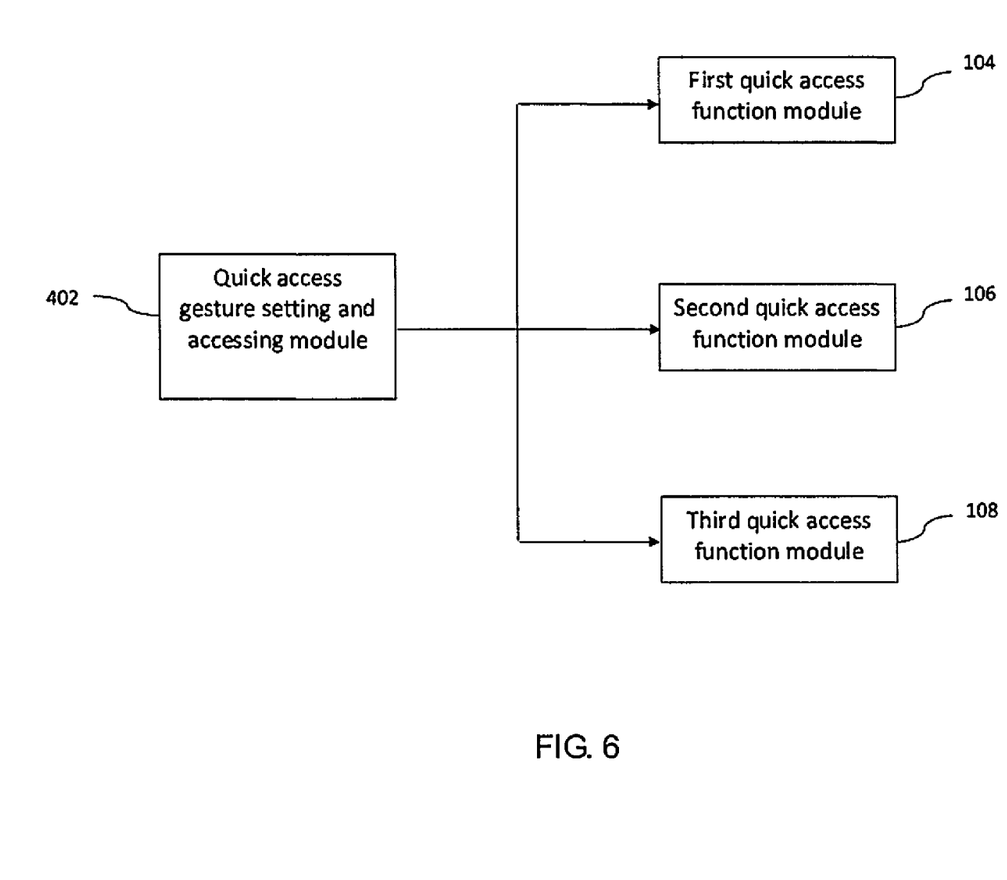
FIG. 6 is a system for executing quick access functions using input gestures according to an embodiment of the present invention.

As illustrated in FIG. 6, the quick access gesture setting and accessing module 402 loaded in the central processing unit 210' of the touch control device 200' in FIG. 4 causes execution of the quick access function modules which may be, for example, the first quick access function module 104, the second quick access function module 106, and the third quick access function module 108 also illustrated in FIG. 1.

The present invention can be widely applied to touch control devices such as touch screen cell phones, MP3, MP4, tablet computers and palm computers. In this embodiment, a touch screen cell phone is used as an example to describe the present invention in detail.

The central processing unit 210 of the touch control device 200 in FIG. 2 is loaded with a keypad lock application 110 in FIG. 3. The majority of the touch screen cell phones available on the market have an autolock, namely having a function of automatically setting cell phone keypad lock to prevent the cell phones from making calls, surfing internet, taking photos, etc. by mistake because the keypad is not locked The execution level of the keypad lock application 110 is relatively high and shields the application of keys, so users can only enter the function module selection menu or equivalently executing the quick access icon and shortcut key setting and accessing module 102 in FIG. 3 after unlocking the keypad.

Figure 7:
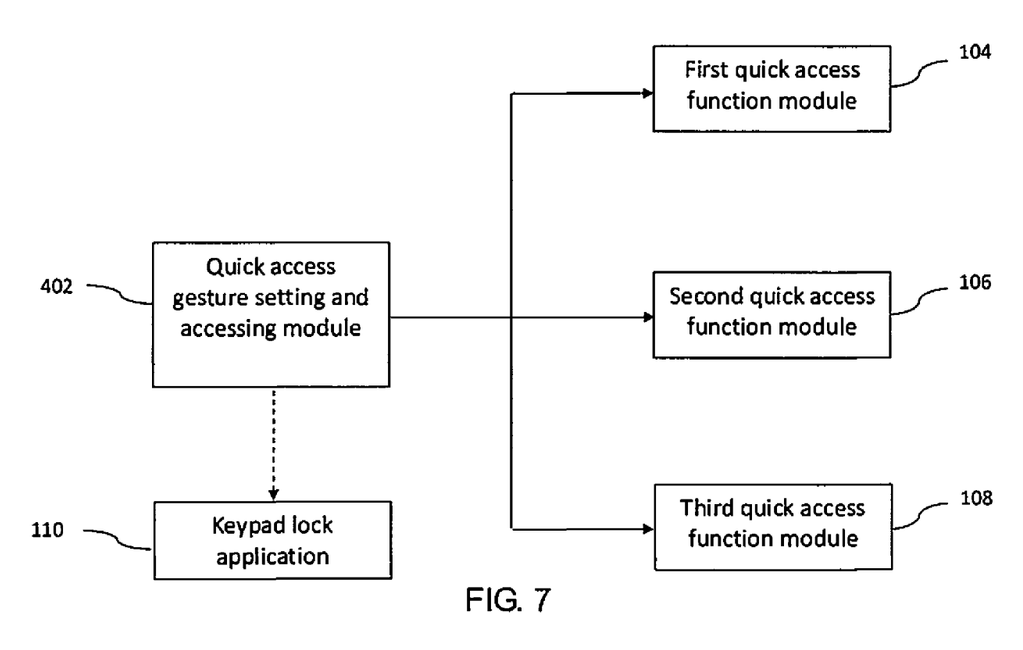
FIG. 7 is system for executing quick access functions using input gestures detectable when a keypad lock application is loaded according to an embodiment of the present invention.

In this embodiment, as illustrated in FIG. 7, by setting the execution level of the quick access function module 104, 106 or 108 to be higher than that of the keypad lock application 110 (as indicated by solid arrows corresponding to a higher execution level and a dashed arrow corresponding to a lower execution level), the currently enabled keypad lock application 110 is skipped and the corresponding quick access function module 104, 106 or 108 is directly executed when comparison shows the recorded information in the register is matched with the parameters in the memory area in step 510 in FIG. 5.

Figure 8:
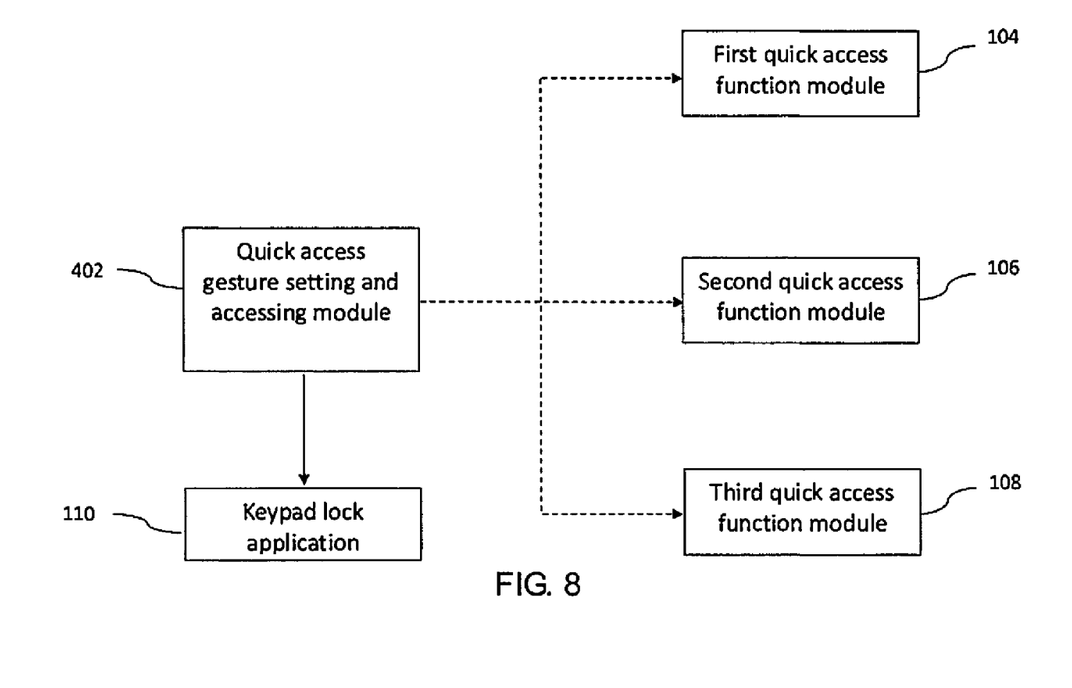
FIG. 8 is system for executing quick access functions using input gestures detectable when a keypad lock application is loaded according to another embodiment of the present invention.

In another embodiment of the present invention, as illustrated in FIG. 8, the execution level of the keypad lock application 110 is higher than that of the quick access function module 104, 106 or 108 (as indicated by solid arrows corresponding to a higher execution level and a dashed arrow corresponding to a lower execution level); the system prompts to exit the keypad lock application 110 first if detecting the keypad lock application 110 is enabled when comparison shows the recorded information in the register is matched with the parameters in the memory area in step 510 in FIG. 5. The system directly executes the corresponding quick access function module 104, 106 or 108 after users carry out the unlocking operation according to the prompt.

The system judges the number of fingers moving on the touch screen when detecting that fingers move in the touch area. Parameters of single-finger slip input gesture include two-dimensional coordinate variable thresholds of the slipping trajectories. The slipping trajectories include particular trajectories of lines, patterns, numbers, symbols, etc. Whether the slipping trajectory is matched with a set trajectory is judged through the real-time two-dimensional coordinate variable. Parameters of two-finger or multi-finger departure and two-figure or multi-finger closure input gesture include distance variable thresholds between two fingers or among more fingers. The system records the coordinates of two fingers in real time when determining that the current two fingers move on the touch screen, calculates the distance between the two fingers, and judges whether the gesture is effective through comparing the difference of the initial and final distances between the two fingers. Judgment of the multi-finger closure or department input gesture is similar to the above way. The parameters of the double or multiple consecutive click input gesture include click times, click time interval thresholds and click pressure thresholds.

The parameters of the input gesture also include the number of fingers moving on the touch screen, width of a finger, etc.

The parameters of the input gesture also include coordinate thresholds of the touch control area. The touch control area may include the detectable scope of the whole touch screen, and may also be limited in a certain special area in the datable scope, including a blank area or any one area limited by the coordinate thresholds. As illustrated in FIG. 4, the blank area refers to a blank area 422 without other functional icons or other linking functions on the touch screen 220'. The input gestures in this area 422 do not cause operations except execution of the quick access function modules (e.g., 104, 106, and 108 in FIG. 6).

The quick access function modules (e.g., 104, 106, and 108 in FIG. 6) include a short message service module, a phonebook module, a call log module, a network service module, a cell phone setting module, a notepad module, an entertainment module and a dialing module, and may also include other function modules of existing cell phones. All shall be incorporated within the protection scope of the present invention.

The execution targets of the quick access functions are not limited to menu options on a certain level, but also include a call log module oriented to a preset number, a network service module oriented to a preset website, a software/hardware setting module oriented to preset software/hardware, an entertainment oriented to the preset audio or video or game software, a dialing module oriented to a preset number, etc.

In another embodiment of the present invention, a preset special number can be quickly dialed by consecutively clicking the same blank area 422 of the touch screen 220' in FIG. 4, so users can conveniently and quickly dial the frequently dialed familiarity numbers preset by themselves when using the touch control device 200' in FIG. 4 which is a touch screen cell phone in this case instead of searching the phonebook one by one.

Figure 9:
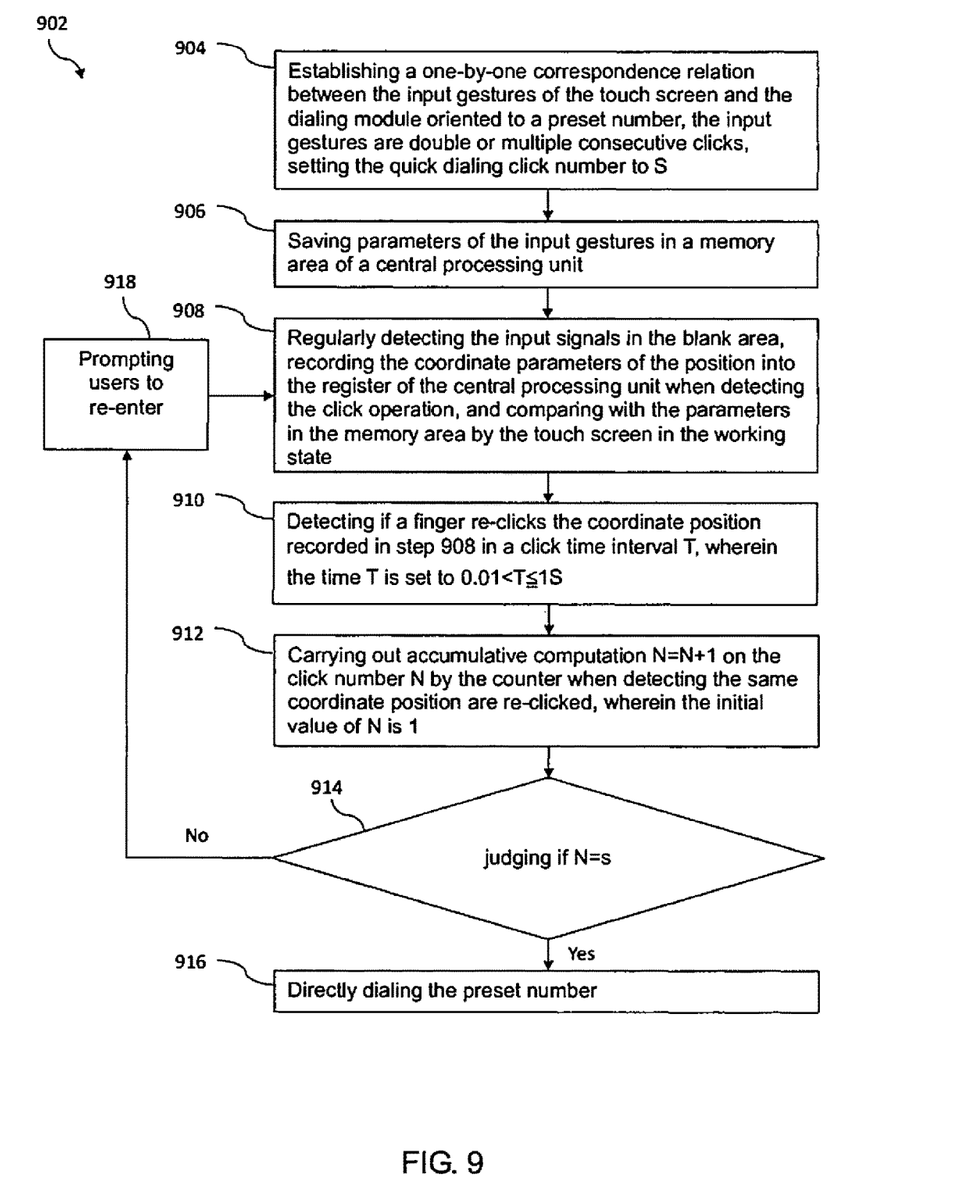
FIG. 9 is a flowchart of a quick access gesture setting and accessing method according to another embodiment of the present invention.

In the implementation scheme of this embodiment, the touch control device 200' quickly and automatically dial the preset familiarity number to make a call in a quick access way after detecting the operation of consecutively clicking in the same blank area 422 of the phone desktop twice, three times or four times. The specific process is a quick access gesture setting and accessing method 902 as illustrated in FIG. 9. The quick access gesture setting and accessing method 902 is performed by a quick access gesture setting and accessing module (not shown in FIG. 4) loaded in the central processing unit 210' in FIG. 4. The quick access gesture setting and accessing method 902 includes the following steps of:

904, establishing a one-by-one correspondence relation between the input gestures of the touch screen 220' and the dialing module oriented to a preset number, the input gestures are double or multiple consecutive clicks, setting the quick dialing click number to S;

906, saving parameters of the input gestures in a memory area of a central processing unit 210' in FIG. 4;

908, regularly detecting the input signals in the blank area 422, recording the coordinate parameters of the position into the register of the central processing unit 210' when detecting the click operation, and comparing with the parameters in the memory area by the touch screen 220' in the working state;

910, detecting if a finger re-clicks the coordinate position recorded in step 908 in a click time interval T, wherein the time T is set to $0.01<T\leq1$ S;

912, carrying out accumulative computation N=N+1 on the click number N by the counter when detecting the same coordinate position are re-clicked, wherein the initial value of N is 1; and,

914, judging if N=s, and if so, 916, directly dialing the preset number; otherwise, 918 prompting users to re-enter or returning to step 908 for continuous detection.

The quick access gesture setting and accessing module performing the quick access gesture setting and accessing method 902 is similar to the quick access gesture setting and accessing module 402 in FIG. 6 and causes execution of the dialing module which may be one of the first quick access function module 104, the second quick access function module 106, and the third quick access function module 108 illustrated in FIG. 1.

If the touch screen cell phone uses this scheme, users of the cell phones conveniently and quickly dial their preset familiarity numbers through consecutively clicking the phone desktop instead of searching the numbers, thus simplifying the operation procedure, saving time, and brining convenience and quick access to use of the cell phones.

The contents of the above mentioned embodiments shall not be regarded as limit of the present invention. Any obvious substitution made within the spirit of the present invention shall fall within the protection scope of the present invention.

What is claimed is:

1. A method comprising the following steps of:
   step (1), performed by a touch control device comprising a touch screen, and comprising: establishing a one-to-one correspondence relation between input gestures of the touch screen and quick access function modules oriented to the input gestures, the input gestures including a double or multiple consecutive click input gesture, setting the number of clicks of the double or multiple consecutive click input gesture to S;
   step (2), performed by the touch control device, and comprising: saving parameters of the input gestures;
   step (3), performed by the touch control device, and comprising: regularly detecting input signals in a touch control area, recording the input signals after detecting a click operation and comparing the input signals with the parameters, wherein the touch control area is a blank area of the touch screen; when the touch control device is locked, unlocking the touch control device and entering a main interface does not cause the blank area to disappear;
   step (4), performed by the touch control device, and comprising: detecting a re-click operation and carrying out an accumulative operation N=N+1 on the number of click operations detected, wherein an initial value of N is 1; and, step (5), performed by the touch control device, and comprising: comparing N to S, and when N=S, executing a corresponding quick access function module of the quick access function modules.

2. The method according to claim 1, wherein the accumulative operation is carried out when a click time interval T between the click operations detected is set to $0.01 < T \leq 1$ s.

3. The method according to claim 1, wherein the parameters of the input gestures include the number of clicks of the double or multiple consecutive click input gesture, click time interval thresholds and click pressure thresholds.

4. The method according to claim 1, wherein the quick access function modules include a short message service module, a phonebook module, a call log module, a network service module, a software/hardware setting module, a notepad module, an entertainment module and a dialing module.

5. The method according to claim 1, wherein the quick access function modules include a call log module oriented to a preset number, a network service module oriented to a preset website, a software/hardware setting module oriented to preset software/hardware, an entertainment oriented to the preset audio or video or game software, and a dialing module oriented to a preset number.

6. The method according to claim 1, wherein when the touch control device is locked, the touch control device directly executes the corresponding quick access function module when N=S.

7. The method according to claim 1, wherein when the touch control device is locked, the method further comprises prompting, by the touch control device, to unlock, before executing the corresponding quick access function module when N=S.

8. A method comprising the following steps of:

step (a), performed by a touch control device comprising a touch screen, and comprising: establishing a one-by-one correspondence relation between an input gesture of the touch screen and a dialing module oriented to a preset number, the input gesture is a double or multiple consecutive click input gesture, setting a quick dialing click number of the double or multiple consecutive click input gesture to S;

step (b), performed by the touch control device, and comprising: saving a parameter of the input gesture;

step (c), performed by the touch control device, and comprising: regularly detecting input signals in a touch control area, recording the input signals after detecting a click operation, and comparing with the parameter, wherein the touch control area is a blank area of the touch screen; when the touch control device is locked, unlocking the touch control device and entering a main interface does not cause the blank area to disappear;

(d). detecting a re-click operation;

step (e), performed by the touch control device, and comprising: carrying out an accumulative computation N=N+1 on a click number N of click operations detected, wherein an initial value of N is 1;

step (f), performed by the touch control device, and comprising: comparing N to S and when N=S, directly dialing the preset number.

9. The method according to claim 8, wherein when the touch control device is locked, the method further comprises prompting, by the touch control device, to unlock, before dials the preset number when N=S.

10. The method according to claim 8, wherein when the touch control device is locked, the touch control device directly dials the preset number when N=S.

11. The method according to claim 8, wherein the accumulative computation is carried out when a click time interval T between the click operations detected is set to $0.01 < T \leq 1$ s.

12. The method according to claim 8, wherein S is greater than two.

* * * * *